US010029417B2

(12) United States Patent
James et al.

(10) Patent No.: US 10,029,417 B2
(45) Date of Patent: Jul. 24, 2018

(54) ARTICULATING BUILD PLATFORM FOR LASER ADDITIVE MANUFACTURING

(71) Applicant: Siemens Energy, Inc., Orlando, FL (US)

(72) Inventors: Allister William James, Chuluota, FL (US); Gerald J. Bruck, Oviedo, FL (US); Ahmed Kamel, Orlando, FL (US); Anand A. Kulkarni, Charlotte, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 619 days.

(21) Appl. No.: 14/480,688

(22) Filed: Sep. 9, 2014

(65) Prior Publication Data

US 2016/0067923 A1    Mar. 10, 2016

(51) Int. Cl.
*B22F 3/105* (2006.01)
*B29C 67/00* (2017.01)
*B33Y 10/00* (2015.01)
*B33Y 30/00* (2015.01)
*B29L 9/00* (2006.01)

(52) U.S. Cl.
CPC ........ *B29C 67/0074* (2013.01); *B22F 3/1055* (2013.01); *B22F 2003/1056* (2013.01); *B22F 2003/1057* (2013.01); *B22F 2999/00* (2013.01); *B29L 2009/00* (2013.01); *B33Y 10/00* (2014.12); *B33Y 30/00* (2014.12); *Y02P 10/295* (2015.11)

(58) Field of Classification Search
CPC .... B29C 67/0074; B22F 3/105; B22F 3/1055; B22F 2003/1056; B22F 2003/1057; B22F 2999/00; Y02P 10/295; B33Y 30/00; B33Y 10/00; B29L 2009/00
See application file for complete search history.

(56) References Cited

U.S. PATENT DOCUMENTS

| 4,818,562 | A | 4/1989 | Arcella et al. |
| 5,837,960 | A * | 11/1998 | Lewis ............ B23K 26/34 219/121.63 |
| 6,027,699 | A | 2/2000 | Holcomb et al. |
| 6,932,935 | B1 * | 8/2005 | Oberhofer ............ B22C 7/00 264/101 |
| 7,959,847 | B2 | 5/2011 | Wicker et al. |
| 8,153,183 | B2 | 4/2012 | Skubie et al. |
| 8,172,562 | B2 | 5/2012 | Mattes |

(Continued)

FOREIGN PATENT DOCUMENTS

| DE | 102008012064 A1 | 9/2009 |
| DE | 102012106141 A1 | 1/2014 |

(Continued)

*Primary Examiner* — Michael N Orlando
*Assistant Examiner* — Cynthia L Schaller

(57) ABSTRACT

An additive manufacturing apparatus (10) including: a container (12) configured to bound a bed of powdered metal material; a fluidization arrangement (18) configured to fluidize the bed of powered material; an articulation mechanism (40) disposed within the container and configured to support and to rotate a component (38) about at least one horizontal axis; and an energy beam (34) configured to selectively scan portions (36) of a surface of the bed of powdered metal material to melt or sinter the selectively scanned portions onto the component.

17 Claims, 3 Drawing Sheets

(56) References Cited

U.S. PATENT DOCUMENTS

| | | |
|---|---|---|
| 8,372,330 B2 | 2/2013 | Ei-Siblani et al. |
| 2008/0109102 A1 | 5/2008 | Sutecliffe |
| 2015/0064047 A1* | 3/2015 | Hyde .................... B22F 3/1055 419/26 |

FOREIGN PATENT DOCUMENTS

| | | |
|---|---|---|
| DE | 102012107297 A1 | 6/2014 |
| WO | 0110631 A2 | 2/2001 |

* cited by examiner

ARTICULATING BUILD PLATFORM FOR LASER ADDITIVE MANUFACTURING

FIELD OF THE INVENTION

This invention relates generally to the field of forming or repairing metal components and parts from a bed of powdered metals. More specifically, this invention relates to using an articulating platform within a fluidized bed of powdered metal material to form or repair parts.

BACKGROUND OF THE INVENTION

Additive manufacturing often starts by slicing a three dimensional representation of an object to be manufactured into very thin layers, thereby creating a two dimensional image of each layer. To form each layer, popular laser additive manufacturing techniques such as selective laser melting (SLM) and selective laser sintering (SLS) involve mechanical pre-placement of a thin layer of metal powder of precise thickness on a horizontal plane. Such pre-placement is achieved by using a mechanical wiper to sweep a uniform layer of the powder or to screed the layer, after which an energy beam, such as a laser, is indexed across the powder layer according to the two dimensional pattern of solid material for the respective layer. After the indexing operation is complete for the respective layer, the horizontal plane of deposited material is lowered and the process is repeated until the three dimensional part is completed. In order to protect the thin layers of fine metal particles from contaminants and from moisture pickup, the operation is performed under an atmosphere of inert gas, such as argon or nitrogen. These processes are limited in that they require a flat, horizontal surface which must be vertically adjusted, they are limited to two dimensional laser processing, they require a mechanically adjustable wiper whose wiping movement limits how a part can be built up, and they require an inert atmosphere. Consequently, there remains room in the art for improvement.

BRIEF DESCRIPTION OF THE DRAWINGS

The invention is explained in the following description in view of the drawings that show.

DETAILED DESCRIPTION OF THE INVENTION

The present inventors have devised a unique and innovative arrangement that decreases production time, increases yield, and increases flexibility in an additive manufacturing system and process such as selective laser sintering or selective laser melting, collectively referred to herein as selective laser heating. Specifically, the arrangement discloses an articulation arrangement disposed inside a bed of fluidized powdered metal material. The articulation arrangement permits the part to be tilted from a neutral, horizontal position to a tilted position while inside the powdered metal material. A fluidization arrangement fluidizes the powdered metal material to facilitate a reduction in resistance between the articulation arrangement and the powdered metal material, and hence reduce stress in the articulation arrangement. Positioning the articulation arrangement within the fluidized bed increases the range of motion of the component and frees up valuable space above the container for the other components.

Figure 1:
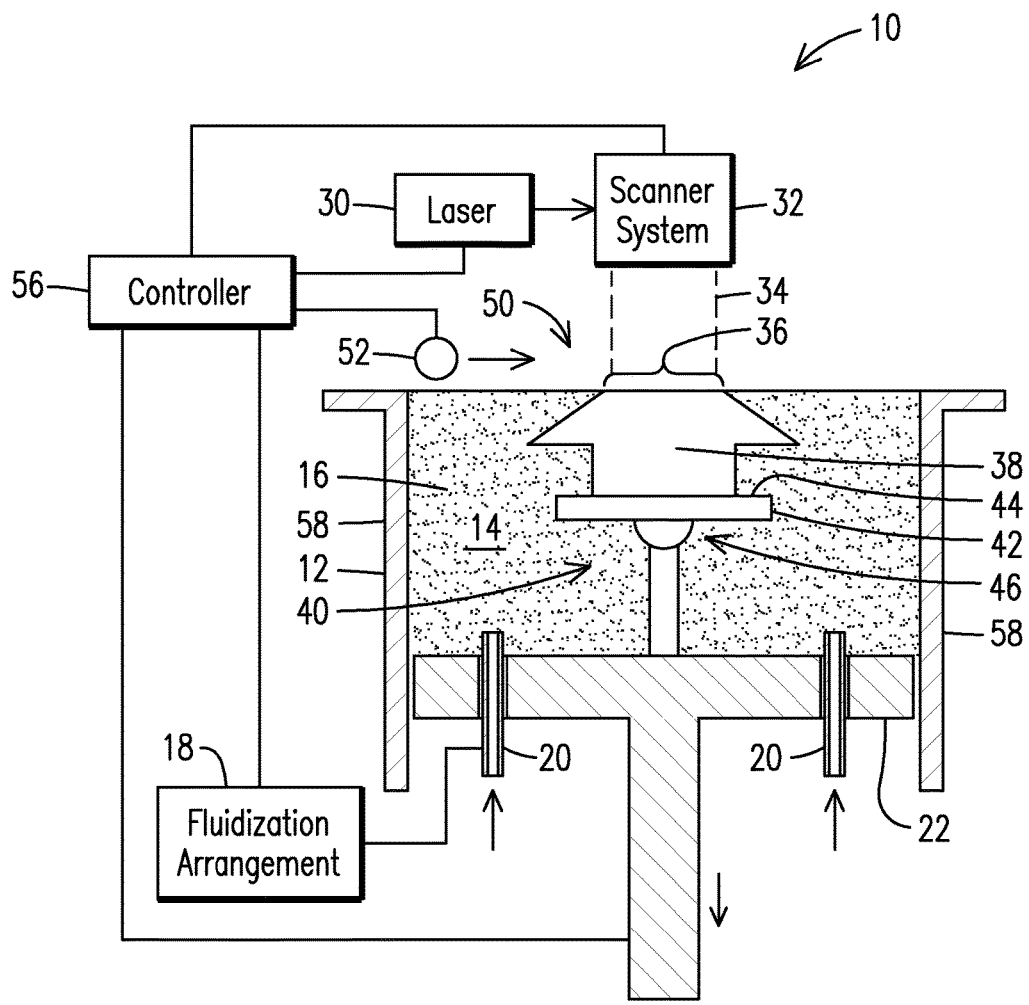
FIG. 1 is a schematic diagram showing an exemplary embodiment of an additive manufacturing arrangement having an articulation mechanism supporting a platform in a horizontal position.

FIG. 1 illustrates an exemplary embodiment of an additive manufacturing system and process such as selective laser sintering or selective laser melting, collectively referred to herein as selective laser heating. An additive manufacturing apparatus 10 includes a container 12 that defines a volume 14 to be filled with powdered metal material 16. The container 12 of powdered metal material 16 can be selectively fluidized by a fluidization arrangement 18 that introduces a gas via one or more tubes 20 through a vertically adjustable bottom 22 of the container 12. An energy beam source 30, such as a laser in an exemplary embodiment, and a scanning system 32 form an energy beam arrangement that enables an energy beam 34, such as a laser beam, to scan a portion 36 of the powdered metal material 16. This scanning is effective to selectively sinter or melt the scanned portion 36 of the powdered metal material 16 onto a component 38, which is disposed in the powdered metal material 16 and resting on an articulation mechanism 40. In the exemplary embodiment shown the articulation mechanism 40 includes a platform 42 having a platform surface 44 on which the component 38 rests or is more advantageously rigidly fixed to, and a joint assembly 46 supporting the platform and secured to the bottom 22 and hence moves with the bottom.

In a neutral position 50 the articulation mechanism 40 holds the platform surface 44 in a horizontal orientation for laser processing and the associated melting or sintering of powdered metal material onto the component 38. The neutral position 50 is the position used by conventional, prior art techniques. In these prior art techniques, if the horizontal orientation of the platform 42 does not hold the component 38 in the proper orientation, supports are used between the platform 42 and the component 38 to properly orient the component 38. However, using these supports adds time and expense to the additive manufacturing process, particularly when the component 38 must be repositioned plural times.

A powder wiper 52 may be present to smooth the powdered metal material between each laser processing of the component. Control of the components, including the energy beam source 30, the scanning system 32, the articulation mechanism 40, the fluidization arrangement 18, and the powder wiper 52, is accomplished via one or more controllers 56.

Figure 2:
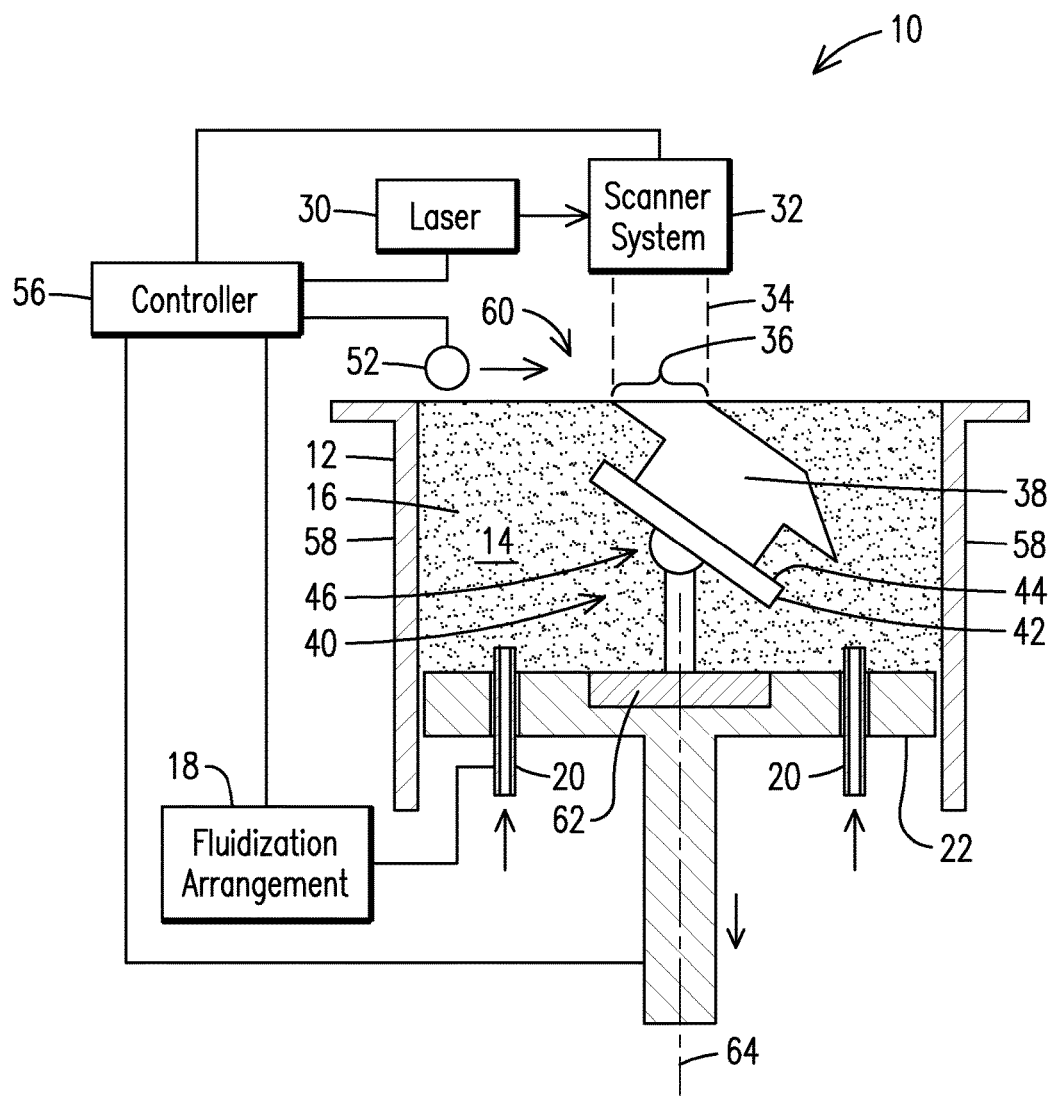
FIG. 2 is a schematic diagram showing the exemplary embodiment of the additive manufacturing arrangement and the articulation mechanism of FIG. 1 tilting the platform.

As can be seen in FIG. 2, unlike the prior art where the platform surface 44 is limited to being in a horizontal orientation, the joint assembly 46 is configured to tilt the platform 42 (i.e. rotate the platform 42 about a horizontal axis) so that the platform surface 44 deviates from being horizontal to being in a tilted position 60. The tilting/rotation may be possible about one, more than one, or all of the horizontal axes. The inventors have recognized that having a platform 42 capable of repositioning the component 38 while the component 38 remains disposed within the powdered metal material 16 represents several advantages not previously disclosed or previously possible in the art.

U.S. Pat. No. 4,818,562 (the '562 patent), the content of which is fully incorporated herein by reference, discloses positioning a component within a fluidized bed of powered material. Fluidizing the powdered metal material enables control of the distribution of the powdered metal material where needed, such as at a focus point of the laser beam. U.S. Pat. No. 7,959,847 (the '847 patent), discloses a stereolithography arrangement where a platform that can lowered into a vat is configured to rotate about a sole horizontal axis outside the vat. The rotation of the platform is disclosed with respect to a stereolithography process, where the component is submerged in a liquid which, when subjected to laser energy, forms a layer of the component. The '847 patent indicates the arrangement can be expanded to include selective laser sintering processes, but does not elaborate on the role of the rotating platform in the selective laser sintering process.

The inventors have recognized that using the apparatus of the '847 patent to perform a selective laser sintering process may not be feasible because the powdered metal material behaves differently than the liquid of the stereolithography process. The powdered metal material is much more resistant to movement of a component disposed therein. In particular, because the powdered metal material would resist compression, the powdered metal material would likely resist downward movement of the platform that may be necessary in the selective laser sintering process to lower the part in preparation for the formation of a subsequent layer. Alternately, it is typical in selective laser melting/selective laser sintering to add material above the part rather than to try to lower the part within a static bed of powdered metal. Thus, it is unclear if the apparatus of the '847 patent would be able to rotate and lower the component within the powdered metal material during a selective laser sintering process. The inventors have also recognized a benefit of fluidizing the powdered metal material that, to the inventor's knowledge, has not been recognized by the prior art: a fluidized, powdered metal material will resist movement of a part disposed therein to a much lesser degree. By fluidizing the powdered metal material as disclosed above, disadvantages of the apparatus of the '847 patent are overcome.

In addition, the amount of articulation that the apparatus of the '847 patent can achieve is limited. In particular, the '847 patent discloses a platform secured to an elevator mechanism via an optional rotation mechanism. The platform can be raised and lowered via the elevator mechanism such that it can be lowered into the vat. The rotation mechanism only permits the platform to be rotated about a single horizontal axis. Consequently, the platform must be lowered into the vat from above, and the rotation mechanism and associated horizontal axis of rotation are positioned above and lateral to the platform. As a result of this configuration, the amount of rotation that can be achieved without rotating the part out of the powdered metal material in the vat is limited. This problem is exacerbated as the component is built-up, when the vat walls also begin to limit the amount of rotation that can be achieved. In addition, the requirement that the platform enter the vat from above, together with the permanent location of the rotation mechanism above the vat, limit the amount of space available for other equipment vital to the process that must also be positioned above the vat, such as the laser, the scanning system, and the powder wiper.

The articulation mechanism 40 the inventors have devised overcomes these disadvantages as well. Due to the stresses involved with trying to rotate a component 38 in a static, and hence movement-resistant powdered metal material 16 using highly accurate, and therefore possibly delicate, positioning componentry, the fluidization arrangement 18 selectively fluidizes the powdered metal material 16 during the tilting/rotation of the platform 42 and component 38. This reduces resistance of the powdered metal material 16 to movement, and associated stress on the articulation mechanism 40. Upon completion of the tilting/rotation movement, the fluidization arrangement 18 may optionally cease delivering fluidizing gas which ceases the fluidization of the powdered metal material 16. After such repositioning, the next laser processing operation may commence.

Being able to tilt the component 38 without having to open the additive manufacturing apparatus 10 (which may be sealed due to a need for an inert environment), remove the component 38 from the container 12, reorient the component 38, the secure the component 38 to the platform surface 44, and recreate the inert environment also represents a tremendous savings at least in terms of lost production time. Further, this arrangement enhances the capability to build or repair multiple surfaces on the component 38, where the melted or sintered material from a first deposit is discrete from the melted or sintered material of a second deposit, such that the two deposits do not touch. This may happen when, for example, repairing two discrete locations of a component, such as a tip and an angel wing of a turbine blade. Such a repair is not possible using conventional selective laser processing because the conventional process requires a wiper to distribute powdered metal material, but the travel of the wiper would be blocked by portions of the turbine blade extending upward out of the powder. A further advantage is that the need for structures used in the conventional process to support the component 38 in various orientations may be reduced or eliminated.

In the exemplary embodiment shown, were the articulation mechanism 42 moves with the bottom 22, compression of the powdered metal material 16 as the component 38 is lowered is eliminated altogether. This further reduces stress on the articulation mechanism 40. This positioning also permits greater freedom of movement. For example, as shown in FIG. 2, the platform can be rotated almost ninety degrees clockwise and counter clockwise. The only thing that might restrict this motion is interference between the component and side walls 58 as the component grows. However, this potential interference can be avoided by making the container wider. In contrast, due to its configuration where the rotation mechanism is above and lateral to the container, the prior art cannot so readily lower and rotate the part without having to make relatively substantial changes to the configuration of its container. Further, by having the articulation mechanism within the powdered metal material 16, valuable space is freed up above the container for the energy beam source 30, scanning system 32, and any other components that benefit from being disposed above the container.

Figure 3:
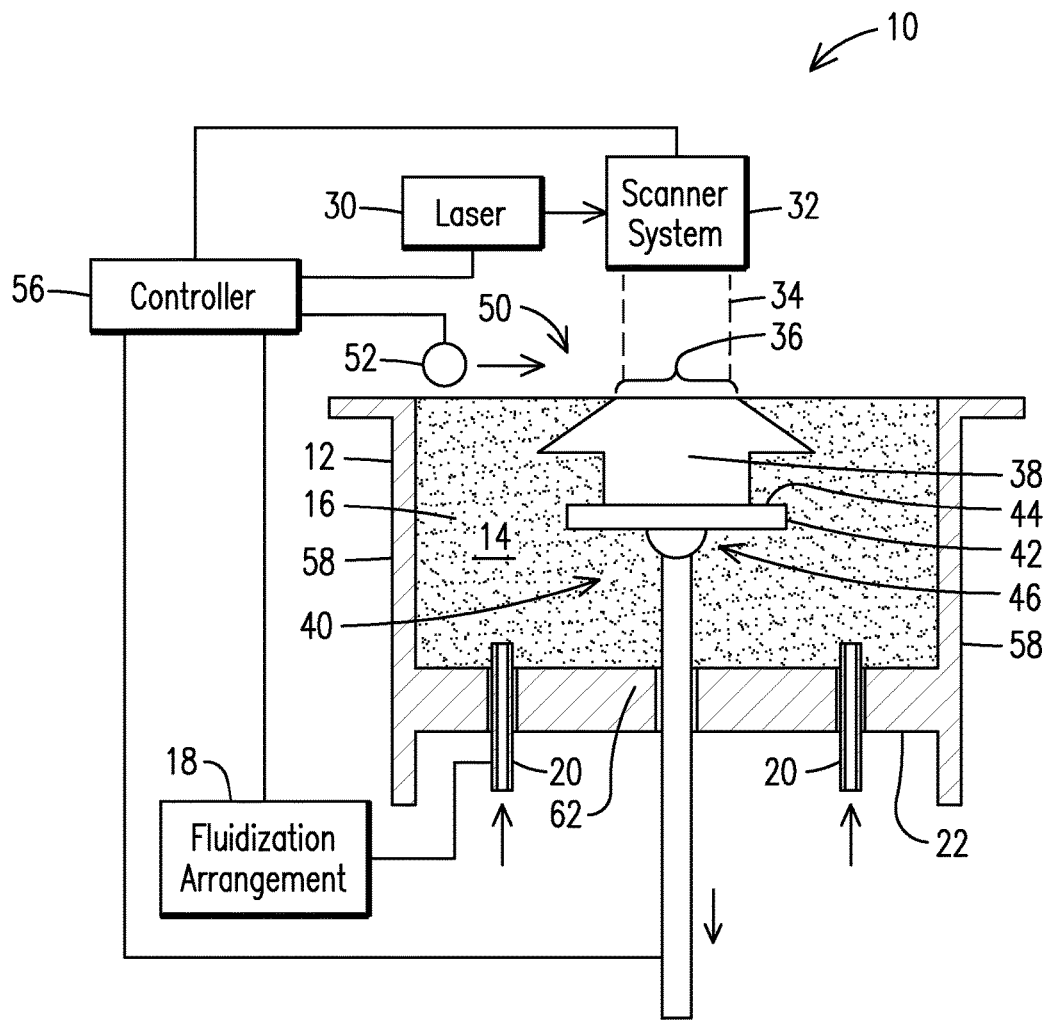
FIG. 3 is a schematic diagram showing an exemplary embodiment of an additive manufacturing arrangement having an articulation mechanism supporting a platform in a horizontal position.

In an alternate exemplary embodiment shown in FIG. 3, the container 12 includes the bottom 22, but the bottom 22 may or may not be vertically adjustable. The articulation mechanism 40 includes the platform 42 and the joint assembly 46, but instead of being secured to the bottom 22, the joint assembly 46 extends through the bottom 22 and is vertically adjustable relative to the bottom 22. In this configuration the bottom 22 need not necessarily be vertically adjustable because the articulation mechanism 40 can execute the vertical adjustment of the component 38 necessary for the additive manufacturing process to occur. It may also be that both the bottom 22 and the articulation mechanism 40 are independently vertically adjustable, thereby permitting maximum operating freedom.

In the event powdered metal material needs to be added to the container 12, known methods to introduce powdered metal materials, such as those discussed in the '562 patent may be used. Another well-known technique to supplement the powdered metal material includes providing the apparatus feed bin and a feed roller to move powdered metal material from the bin to the container 12 between scanning steps of the laser beam. To that end, the container 12 may be equipped with sensors, such as optical-type sensors to detect when the surface of the container 12 drops below a predetermined level to initiate a sequence for adding powdered metal material.

The energy beam 34 used may be a diode laser beam having a generally rectangular cross-sectional shape, although other known types of energy beams may be used, such as electron beam, plasma beam, one or more circular laser beams, a scanned laser beam (scanned one, two or three dimensionally), an integrated laser beam, etc. The rectangular shape may be particularly advantageous for embodiments having a relatively large area to be clad; however, the beam may be adaptable to cover relatively small areas such small distressed regions in need of repair. The broad area beam produced by a diode laser helps to reduce weld heat input, heat affected zone, dilution from the substrate and residual stresses, all of which reduce the tendency for the cracking effects normally associated with superalloy repair and manufacture.

Optical conditions and hardware optics used to generate a broad area laser exposure may include, but are not limited to: defocusing of the laser beam; use of diode lasers that generate rectangular energy sources at focus; use of integrating optics such as segmented mirrors to generate rectangular energy sources at focus; scanning (rastering) of the laser beam in one or more dimensions; and the use of focusing optics of variable beam diameter (e.g., 0.5 mm at focus for fine detailed work varied to 2.0 mm at focus for less detailed work). The motion of the optics and/or substrate may be programmed as in a selective laser melting or sintering process to build a custom shape layer deposit. To that end, the laser beam source is controllable so that laser parameters such as the laser power, dimensions of the scanning area and traversal speed of the laser are controlled so that the thickness of the deposit corresponds to the thickness of the previously formed substrate or that metal is according to the predetermined configuration, shape or dimensions of the component.

The process disclosed herein may be useful for original equipment manufacturing or for rapid prototyping of parts. Furthermore, the process may be used for component repair applications, such as for forming a replacement blade tip on a gas turbine blade that has been removed from service for refurbishing. It will be appreciated that the use of powdered metal material 16 facilitates the deposition of functionally graded materials, where the composition of the deposited material varies across time and space. For example, if the component 38 is a gas turbine vane, a platform portion of the vane may be a first composition and an airfoil portion of the vane may be a second, different composition. In other embodiments the alloy composition may vary from an interior wall to an exterior wall of a product, or from within a product to near its surfaces. The alloy composition may be varied in response to anticipated operating conditions requiring different mechanical or corrosion resistance properties, and with consideration of the cost of the materials.

From the foregoing it can be seen that the inventors have created an arrangement that increases productivity, increase yield, and decreases costs, while employing technology that is available and cost effective to implement. Consequently, this represents an improvement in the art.

In the above detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation. Accordingly, it is intended that the invention be limited only by the spirit and scope of the appended claims.

The invention claimed is:

1. An additive manufacturing apparatus for use in manufacturing a component, the apparatus comprising:
   a container;
   a bed of powdered metal material disposed within the container and defining a surface;
   a fluidization arrangement coupled to the container and operable to fluidize the bed of powdered metal material;
   an articulation mechanism disposed within the container and completely surrounded and submerged within the bed of powdered metal, the articulation mechanism operable to support the component and to rotate the component about an axis that is normal to a vertical axis; and
   an energy beam arrangement configured to selectively scan portions of the surface of the bed of powdered metal material to melt or sinter the selectively scanned portions onto the component.

2. The additive manufacturing apparatus of claim 1, wherein the container comprises a bottom that is vertically adjustable, and wherein the articulation mechanism is secured to the bottom.

3. The additive manufacturing apparatus of claim 2, wherein the articulation mechanism comprises a platform on which the component rests, and a joint assembly secured to the platform and to the bottom.

4. The additive manufacturing apparatus of claim 1, wherein the container comprises a bottom, and wherein the articulation mechanism is configured to move vertically relative to the bottom.

5. The additive manufacturing apparatus of claim 1, wherein the articulation mechanism is configured to rotate the component about all horizontal axes.

6. The additive manufacturing apparatus of claim 1, wherein the articulation mechanism is further configured to move the component horizontally.

7. The additive manufacturing apparatus of claim 1, wherein the energy beam arrangement comprises a laser beam.

8. An additive manufacturing apparatus comprising:
   a container comprising a vertically adjustable bottom;
   a bed of powdered metal material disposed within the container to define a surface;
   a fluidization arrangement coupled to the container and operable to fluidize the bed of powdered metal material;
   an articulation mechanism coupled to and movable along a vertical axis with the bottom, the articulation mechanism completely surrounded by the bed of powdered metal material and operable to rotate about a horizontal axis; and an energy beam arrangement configured to selectively scan portions of the surface of the bed of powdered metal material to melt or sinter the selectively scanned portions.

9. The additive manufacturing apparatus of claim 8, wherein the articulation mechanism is secured to the bottom.

10. The additive manufacturing apparatus of claim 9, wherein the articulation mechanism comprises a platform, and a joint assembly secured to the platform and to the bottom.

11. The additive manufacturing apparatus of claim 8, wherein the articulation mechanism is further configured to move the component horizontally.

12. A method, comprising:
   disposing a component in a container configured to bound a bed of powdered metal material defining a surface;
   supporting the component with an articulation mechanism disposed within the container and completely surrounded and submerged within the bed of powdered metal, the articulation mechanism operable to support the component and to rotate the component about an axis that is normal to a vertical axis;
   selectively melting or sintering portions of the surface of the bed of powdered metal material with an energy beam arrangement to form a deposit on the component;
   tilting the component while the component is surrounded by the bed of powdered metal material; and
   fluidizing the bed of powdered metal material with a fluidization arrangement coupled to the container while tilting the component.

13. The method of claim 12, comprising selectively melting or sintering portions of the bed of powdered metal material to form a first deposit on the component; then tilting the component; and then selectively melting or sintering portions of the bed of powdered metal material to form a second deposit on the component.

14. The method of claim 13, wherein the first deposit and the second deposit are applied to different regions of the component.

15. The method of claim 12, wherein the container comprises a vertically adjustable bottom, the method further comprising vertically adjusting the bottom and vertically adjusting the articulation mechanism as the bottom is vertically adjusting.

16. The method of claim 12, wherein the articulation mechanism is secured to the bottom.

17. The method of claim 12, further comprising moving the component horizontally, and fluidizing the bed of powdered metal material while moving the component horizontally.

* * * * *